US011976510B1

(12) United States Patent
Hildreth

(10) Patent No.: US 11,976,510 B1
(45) Date of Patent: May 7, 2024

(54) STRUCTURAL OFFSET ADAPTOR FOR INSTALLING GLASS IN A DOOR FRAME

(71) Applicant: Peter J Hildreth, Holtsville, NY (US)

(72) Inventor: Peter J Hildreth, Holtsville, NY (US)

( * ) Notice: Subject to any disclaimer, the term of this patent is extended or adjusted under 35 U.S.C. 154(b) by 0 days.

(21) Appl. No.: 17/716,243

(22) Filed: Apr. 8, 2022

Related U.S. Application Data

(60) Provisional application No. 63/174,749, filed on Apr. 14, 2021.

(51) Int. Cl.
*E06B 3/58* (2006.01)

(52) U.S. Cl.
CPC .......... *E06B 3/5814* (2013.01); *E06B 3/5821* (2013.01)

(58) Field of Classification Search
CPC ........ E06B 3/58; E06B 3/5821; E06B 3/5828; E06B 3/5814; E06B 3/5892; E06B 3/60; E06B 3/70; E06B 2003/7044
See application file for complete search history.

(56) References Cited

U.S. PATENT DOCUMENTS 3,566,570 A * 3/1971 Evans .................. E06B 3/5828 52/775
4,314,424 A * 2/1982 Gordon .................. E06B 3/308 49/495.1
4,897,975 A * 2/1990 Artwick ................ E06B 3/5892 52/775
2019/0390506 A1* 12/2019 Gagne .................. E06B 3/5409

FOREIGN PATENT DOCUMENTS

GB 605676 A * 7/1948
GB 2164988 A * 4/1986 ........... E06B 3/5821
GB 2263131 A * 7/1993 ............... E06B 3/08

* cited by examiner

*Primary Examiner* — Christine T Cajilig
(74) *Attorney, Agent, or Firm* — Betsy Kingsbury Dowd; BKDowd Law P.C.

(57) ABSTRACT

A structural offset adaptor formed as a unitary body for installing glass in a door frame includes snap-in connecting portions extending along each side of the structural offset adaptor, configured to retain the structural offset adaptor on an inner perimetral surface of the frame. The adaptor is configured with an inner wall and an unenclosed space adjacent the inner wall which allows the glass pane to be installed offset from the center of the door frame and flush to the push surface of the door frame. A glass-paned door with the adaptor installed on the inner perimetral surface includes the glass pane installed in the unenclosed space and flush to the push surface of the door frame. A method of installing a glass pane in a door frame includes mounting the glass flush with a push side of the door frame via the adaptor.

11 Claims, 10 Drawing Sheets

STRUCTURAL OFFSET ADAPTOR FOR INSTALLING GLASS IN A DOOR FRAME

CROSS-REFERENCE TO RELATED APPLICATIONS

This application claims the benefit of and priority to U.S. Provisional Application Ser. No. 63/174,749 entitled "STRUCTURAL OFFSET ADAPTOR FOR INSTALLING GLASS IN A COMMERCIAL DOOR," filed Apr. 14, 2021, the entirety of which is hereby incorporated herein by reference thereto.

FIELD OF DISCLOSURE

The present disclosure relates generally to doors with glass panes, in particular, to devices and methods for installing a glass pane in a door.

BACKGROUND

As understood by those of skill in the art, there are numerous standards required in the manufacture of commercial doors. One particular door 5 including a narrow-stile type door frame 10 is depicted in FIG. 1. The door frame 10, typically made of aluminum, is characterized by a left stile 12, a right stile 14, a top rail 16, and a bottom rail 18. Commercial doors must be compliant with standards set by the Americans with Disability Act ("ADA"). In accordance with the ADA standards, a lower portion 24 of a door on the push side 20 of the door 5, extending at least 10 inches in height 19 from the bottom edge 26 of the door 5, must form a smooth, planar surface 27 flush across a full accessible width 22 of the door 5. In conventional doors, as shown in FIG. 1, this is accomplished by constructing the bottom rail 18 of the door frame 10, which extends between each of the left 12 and right stile 14, to be at the height 19 required to form the smooth, planar surface 27, i.e., at least 10 inches high.

As discussed further below in reference to FIGS. 2A-2C, when glass panes are desired in such ADA-compliant doors having a 10-inch or higher bottom rail 18, the glass panel 28 (also referred to herein as "glass" or "glass pane") is conventionally recessed relative to a door surface 25 on the push side 20 of the door 5 (also referred to herein as push surface 25) so that it is aligned with a center plane 35, for example, of the door frame 10 (see FIGS. 2A-2C). Currently, there is no known construction that allows the glass panel 28 to be flush-mounted to form the smooth, planar surface 27 of the lower portion of the push surface 25, which would allow the bottom rail 18 to be less than 10-inches high, and the glass panel 28 to form a portion of the flush, 10-inch high, smooth, planar surface 27 of the lower portion 24 of the door surface 25 in compliance with ADA standards. There are also no known flush-mounted glass panels in commercial doors installed using a structural silicone glazing (SSG) method, for example, a process heretofor known in the art for fixing glass in a fixed window frame using nothing more than silicone and/or tape adhesive to hold the glass in place.

There is a need, not provided for in the prior art, for commercial glass doors that are not restricted to bottom rails 18 that are at least 10 inches in height relative to the ground or floor, and for commercial glass doors with flush-mounted glass panes using an SSG method.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a structural offset adaptor for installing glass in a door frame. The structural offset adaptor allows the glass to be flush-mounted to align with a push surface of a door frame using structural silicone glazing (SSG) method.

The present disclosure is also directed to a door including the structural offset adaptor mounted onto a glass-facing, or inner perimetral, side of a door frame of the door, and a flush-mounted glass pane installed in the door frame via the structural offset adaptor.

The present disclosure is also directed to a door that is ADA-compliant, the door including a bottom rail and a glass pane positioned flush to a push surface of the bottom rail of the door, wherein a flush-mounted surface of the glass pane forms a smooth planar surface with the push surface of the bottom rail.

The bottom rail, in embodiments, is less than 10-inches high from a bottom edge of the door.

The present disclosure is also directed to an adaptor formed as a unitary body for installing a glass pane in a door frame, which includes a first connecting portion formed along a first side of the adaptor; and a second connecting portion forming a second side of the adaptor. The second connecting portion is preferably positioned parallel to and opposite the first connecting portion.

The adaptor also includes an inner wall positioned between and parallel to the first side and the second side of the adaptor; and a lower leg, in embodiments, extending perpendicularly outward to the second side from a lower end portion of the inner wall and terminating at the second connecting portion. An open portion providing an unenclosed space is formed above the lower leg and the second connecting portion, adjacent the inner wall and extending outward from the inner wall to, and over, the second side of the adaptor. The adaptor is preferably configured in use to be retained on an inner perimetral surface of a door frame via the first connecting portion and the second connecting portion and to position a glass pane in the open portion and over the second side of the adaptor.

In embodiments, the inner wall is centered between the first side and the second side.

In further embodiments, the inner wall is substantially centered between the first side and the second side such that a glass pane installed in the open portion in use is flush with a surface of a door frame.

The second connecting portion forming the second side of the adaptor, in embodiments, is wedge-shaped.

A cross-section of the first connecting portion, in embodiments, is in one of a C-shape, U-shape and V-shape.

The adaptor may also include, in embodiments, an outer wall formed along the first side of the adaptor, wherein the first connecting portion is formed along a lower edge of the outer wall along the first side of the adaptor.

The adaptor may also include, in embodiments, an upper leg extending perpendicularly inward from the outer wall of the adaptor, an end portion of the upper leg extending beyond the inner wall over only a portion of the lower leg.

The present disclosure is also directed to a door, which includes a door frame, the door frame including a push side and a back side opposite the push side; a glass pane installed in the door frame; and an adaptor mounted on an inner perimetral surface of the door frame.

The adaptor includes a first side and a second side, a first connecting portion formed along the first side of the adaptor, a second connecting portion forming the second side of the adaptor, the second connecting portion preferably positioned parallel to and opposite the first connecting portion, an inner wall positioned between and parallel to the first side and the second side of the adaptor, and a lower leg preferably extending perpendicularly outward to the second side from a lower end portion of the inner wall and terminating at the second connecting portion. The open portion provides an unenclosed space formed above the lower leg and the second connecting portion, adjacent the inner wall and extending outward from the inner wall to and over the second side of the adaptor.

The adaptor is retained on the inner perimetral surface of the door frame via the first connecting portion and the second connecting portion, the first connecting portion being positioned and retained along the back side of the door frame, and the second connecting portion being positioned and retained along the push side of the door frame. The glass pane is positioned in the open portion over the second side of the adaptor.

In embodiments, the inner perimetral surface includes a channel extending along each of the push side and the back side of the door frame, each of the first connecting portion and the second connecting portion being retained within the channel extending along each of the push side and the back side of the door frame, respectively. The lower leg of the adaptor, in embodiments, rests on the inner perimetral surface between the channel extending along each of the push side and the back side of the door frame.

The channel along the push side of the door frame, in embodiments, may be V-shaped and the second connecting portion forming the second side of the adaptor wedge-shaped and configured to fit into and against surfaces of the channel.

A cross-section of the first connecting portion, in embodiments, is in one of a C-shape, U-shape and V-shape.

In preferred embodiments, the glass pane is positioned flush with the push surface of the door frame.

In further embodiments, the door is a swing door, the door frame includes a bottom rail less than ten inches high, and the push surface of the bottom rail is flush with the glass pane to form a smooth planar surface with the glass pane.

In embodiments, an outer wall is positioned along the first side of the adaptor and the first connecting portion is formed along a lower edge of the outer wall.

In embodiments, the adaptor further includes an upper leg extending perpendicularly inward from the outer wall of the adaptor, an end portion of the upper leg extending beyond the inner wall and over only a portion of the lower leg. The glass pane can, in embodiments, be positioned in the open portion adjacent the end portion and over the second side of the adaptor.

The second side of the adaptor, in embodiments, consists of the second connecting portion and is confined within the channel along the push side of the door frame.

The adaptor, in embodiments, further includes an adhesive material between the glass pane and the inner wall, and between the glass pane and the end portion of the upper leg, with the position of the glass pane adjacent the end portion of the upper leg and the inner wall being fixed by the adhesive material, which, in embodiments, may be adhesive tape.

In further embodiments, a silicone adhesive is layered between the lower leg of the adaptor and the glass pane.

The glass pane, in embodiments, rests on the silicone adhesive and is positioned flush to the push surface of the door frame. Preferably, the silicone adhesive extends over the inner perimetral surface along the push side of the door frame, the second side of the adaptor, and the lower leg of the adaptor from the push side of the door frame to the inner wall of the adaptor.

In yet additional embodiments, the glass pane is positioned adjacent the end portion in the open portion and flush with the push surface of the door frame.

The inner wall with the end portion extending perpendicularly therefrom may be, in embodiments, substantially centered between the first side and the second side of the adaptor.

The present disclosure is also directed to a method of installing a glass pane in a door frame flush with a push side of the door frame, the door frame including the push side and a back side opposite the push side. The method includes providing an adaptor configured to fit onto an inner perimetral surface of the door frame, the adaptor including a first side and a second side and an inner wall positioned between and preferably parallel to the first side and a second side of the adaptor. The method also preferably includes mounting the adaptor on the inner perimetral surface of the door frame via a first connecting portion formed along a lower edge of the first side of the adaptor and a second connecting portion forming the second side of the adaptor. Mounting the adaptor in embodiments includes positioning and retaining the first connecting portion along the back side of the door frame, and positioning and retaining the second connecting portion along the push side of the door frame.

The method further includes positioning the glass pane in an open portion formed over the second side of the adaptor adjacent the inner wall of the adaptor and flush with the door frame.

In embodiments, the method further includes applying an adhesive material to the inner wall and adhering the glass pane to the inner wall in position flush with the push side of the door frame via the adhesive material. In further embodiments, the method includes retaining the glass pane in position flush with the push side of the door by filling a space between the adaptor, the glass pane and the adhesive material with a silicone adhesive.

In additional embodiments, the adaptor further includes a lower leg extending perpendicularly outward to the second side from a lower end portion of the inner wall and terminating at the second connecting portion, the step of filling the space between the adaptor, the glass pane and the adhesive material further including layering the silicone adhesive over the inner perimetral surface along the push side of the door frame, and over the second side of the adaptor and the lower leg of the adaptor from the push side of the door frame to the inner wall of the adaptor. In embodiments, the method further includes resting the glass pane on the silicone adhesive and flush to the push surface of the door frame.

In embodiments, the step of positioning and retaining the second connecting portion along the push side of the door frame includes retaining the second side of the adaptor within a channel formed along the push side of the door.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

Figure 1:
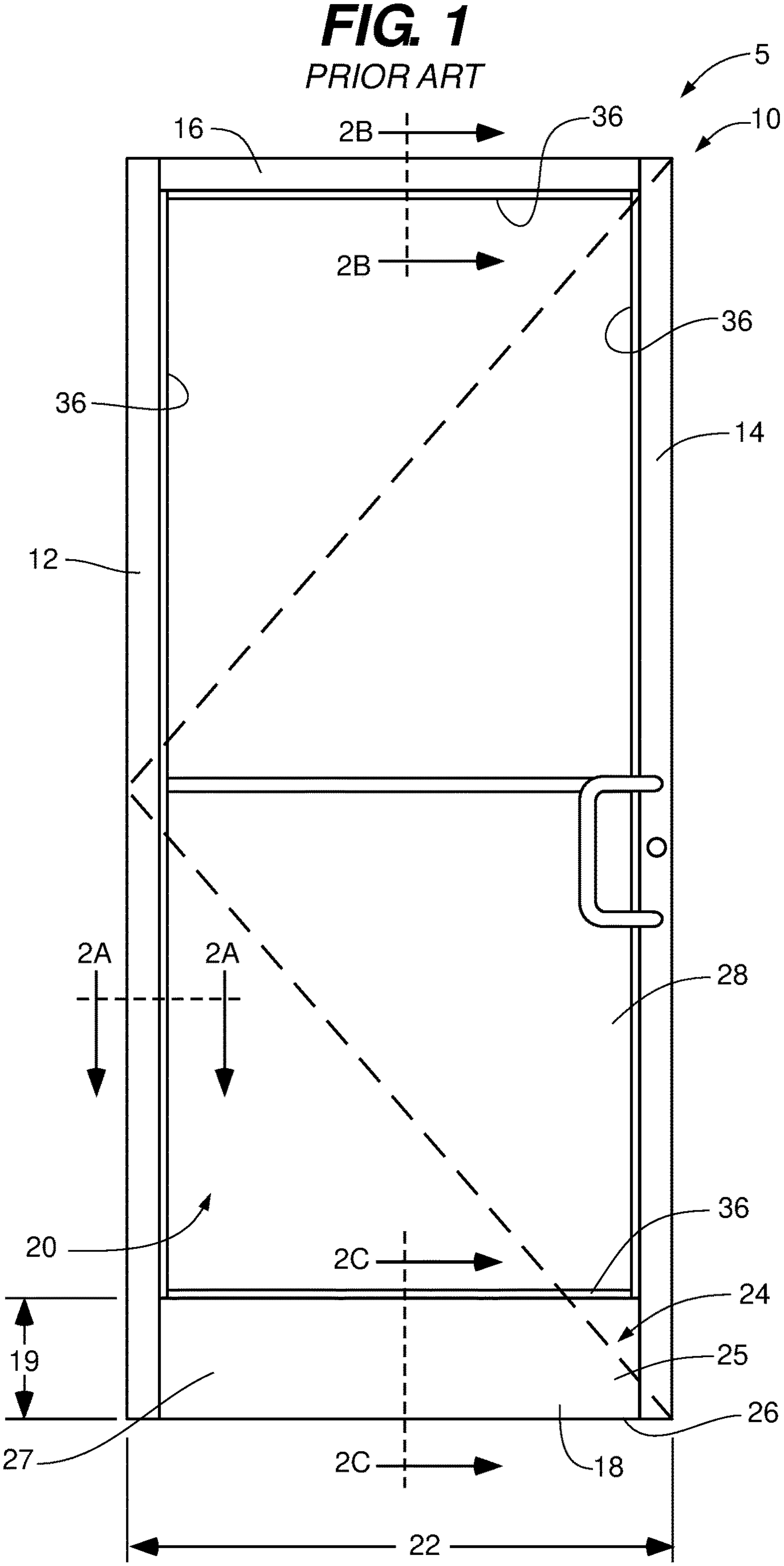
FIG. 1 PRIOR ART
FIG. 1 is a pictorial representation of an elevation view of a prior art commercial glass door with glass installed along a central plane.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of a structural offset adaptor for installing glass in a commercial glass door, and commercial glass doors that include the structural offset adaptor as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

The present disclosure is directed to a structural offset adaptor (also referred to herein as an "adaptor" for short) for installing glass in a commercial glass door. The present disclosure is also directed to commercial glass doors that are not restricted to bottom rails that are at least ten (10) inches in height relative to the ground or floor, and for commercial glass doors with flush-mounted glass panes using a structural silicone glazing process.

The term "glazing" refers generally to the installation of glass. The terms "structural silicone glazed" and "structural silicone glazing" both of which are also referred to as "SSG" is used herein to describe a process that utilizes silicone sealants and/or adhesive tapes for the structural transfer of loads from the glass to its perimeter support system and to retain the glass in the opening surrounded by the perimeter support system.

The terms "upper" and "lower" are used to describe the position of elements or features of the structural offset adaptor of the disclosure relative to an inner perimetral surface of a door frame on which it is installed. For example, a "lower" leg is closer to the inner perimetral surface than an "upper" leg.

Referring to FIG. 1 and FIGS. 2A-2C, in an exemplary prior art commercial door including stiles and rails as shown, the glass pane 28 is positioned in the center plane 35 of the door as shown and described herein.

Figure 2A:
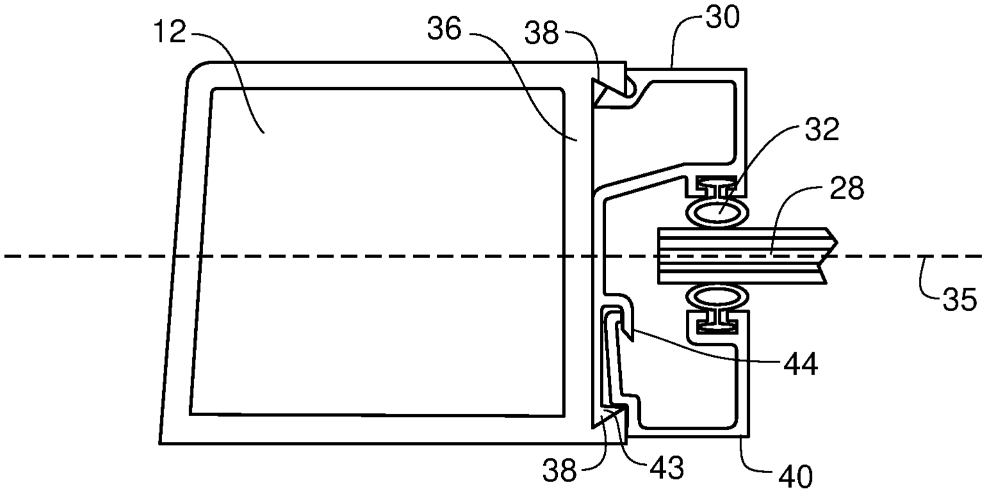
FIG. 2A PRIOR ART
FIG. 2A is a pictorial representation of a cross-section through a stile of the door of FIG. 1 with the glass installed.
Figure 2B:
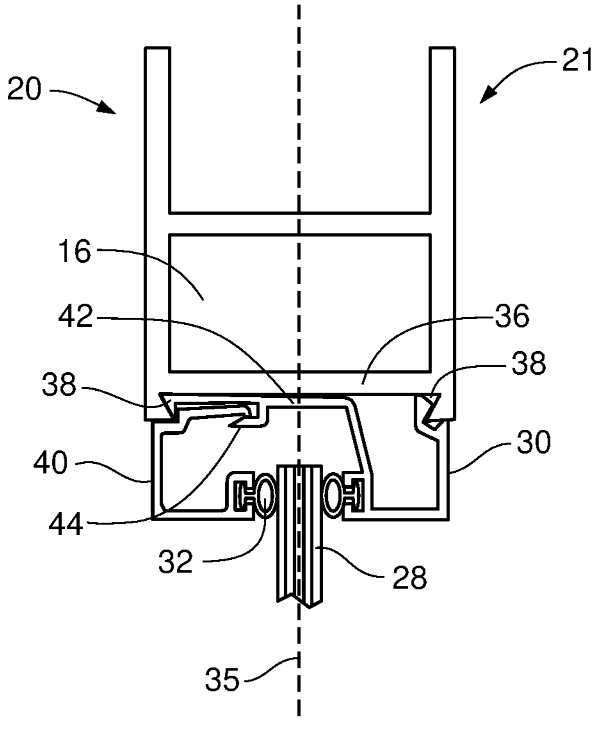
FIG. 2B PRIOR ART
FIG. 2B is a pictorial representation of a cross-section through the top rail of the door of FIG. 1 with the glass installed.

Referring to FIG. 1 and FIGS. 2A-2C, in glass doors with an ADA-compliant 10-inch high bottom rail 18, the glass pane 28 is installed using a set of two interlocking snap-in connectors 23, each set 23 including a first connector 30 and a second connector 40 to hold the glass pane 28 in position along each of the top rail 16 (FIG. 2B) and the bottom rail 18 (FIG. 2C) in the center plane 35, and additional sets of two interlocking snap-in connectors 23 to hold the glass pane 28 in position within the center plane 35 of the door frame 10 along each of the left stile 12 and the right stile 14 (see FIG. 2A). Each of the first connector 30 and the second connector 40 used to hold the glass pane 28 in position includes a glass stop 32 on a glass-facing side 36 of each of the first 30 and second connector 40, which is typically formed of a material such as rubber or foam, to hold the glass pane 28 upright without breakage. The sets of interlocking snap-in connectors 23 extend along each of the top 16 and bottom rail 18 and each of the left 12 and right stile 14 for holding the glass pane 28 in place.

Figure 2C:
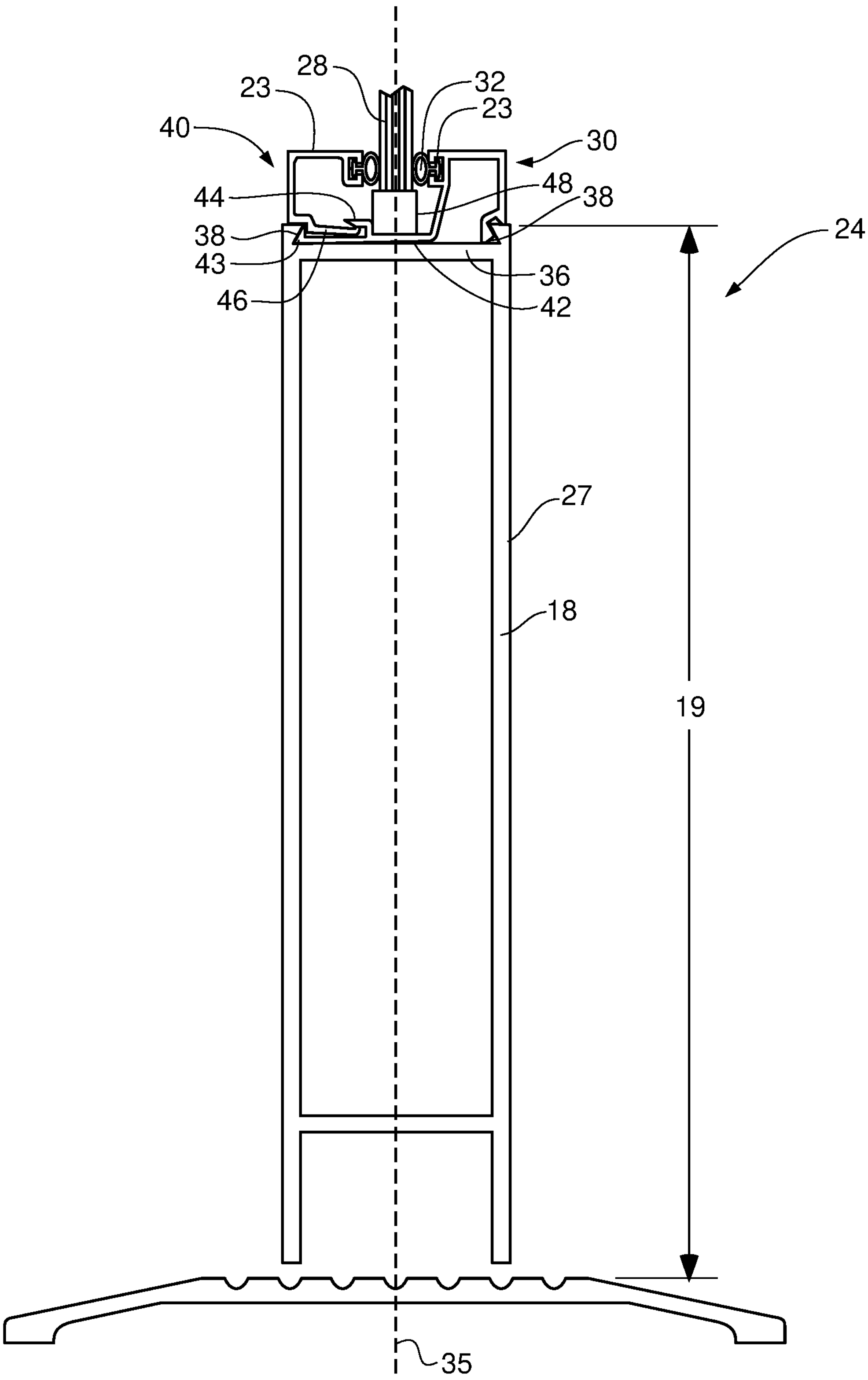
FIG. 2C PRIOR ART
FIG. 2C is a pictorial representation of a cross-section through the bottom rail of the door of FIG. 1 with the glass installed.
Figure 2D:
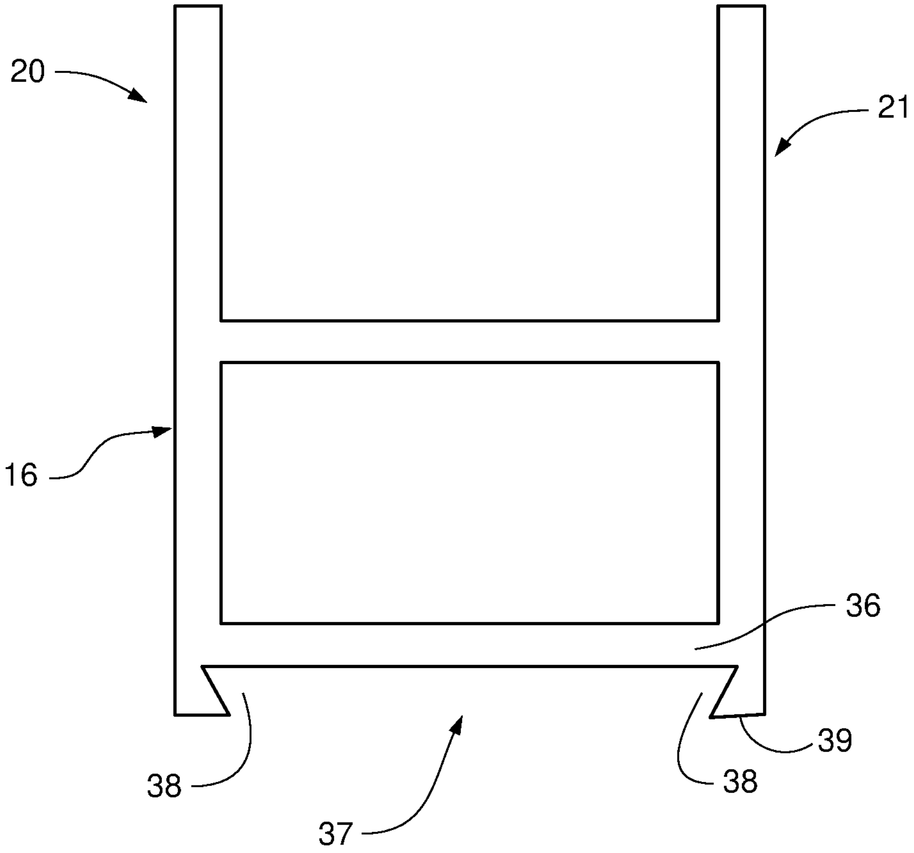
FIG. 2D is a pictorial representation of a cross-section through the top rail of FIG. 2B, prior to installation of glass.

Referring also to FIG. 2D, the positioning of each set of the interlocking snap-in connectors 23 is facilitated by the shape of the inner, or glass-facing, side 36 of each of the top 16 and bottom rail 18 and each of the left 12 and right stile 14. While the width and design details of the rails and stiles may differ from one door frame to another, the structure of the glass-facing side 36 of most door frames have similar features. As shown in FIG. 2D, for example, each glass-facing side 36 of the door frame 10 exemplified by FIG. 1 forms a socket 37, which may be in the shape of a dovetail-type socket, a V-shaped channel 38 being formed along each of a front (push) side 20 and a back side 21 of the door 5. Each of the first 30 and second connectors 40 is configured and shaped to interlock with each other and to be retained within the corresponding V-shaped channel 38.

Referring to FIG. 2C, for example, the first connector 30 includes a lower leg 42 that rests on a middle portion of the glass-facing side 36 of the bottom rail 18, ending in a wedged portion that wedges into one of the V-shaped channels 38 and having a stepped portion 44. Second connector 40 includes a lower leg 46 that hooks under the stepped portion 44 when locked in place. Each of the sets of connectors 23 snap into each other and to the rails 16, 18 and stiles 12, 14 of the door frame 10 in similar fashion. To set and hold the glass 28 in position atop the bottom rail 18, setting block(s) 48 are also centered for positioning the glass pane 28 in the center plane 35 of the door and for preventing the glass pane 28 from slipping or settling down in the door. One or more setting block 48 may be positioned along the width of the bottom rail 18. The setting block(s) 48 holds and supports the weight of the glass panel 28, prevents breakage or chipping of the glass 28 against the typically metallic bottom rail 18, and maintains the positioning of the glass pane 28 in height alignment along the bottom rail 18 and with the center plane 35 before attaching the connectors 30, 40, to the glass pane 28.

Figure 3A:
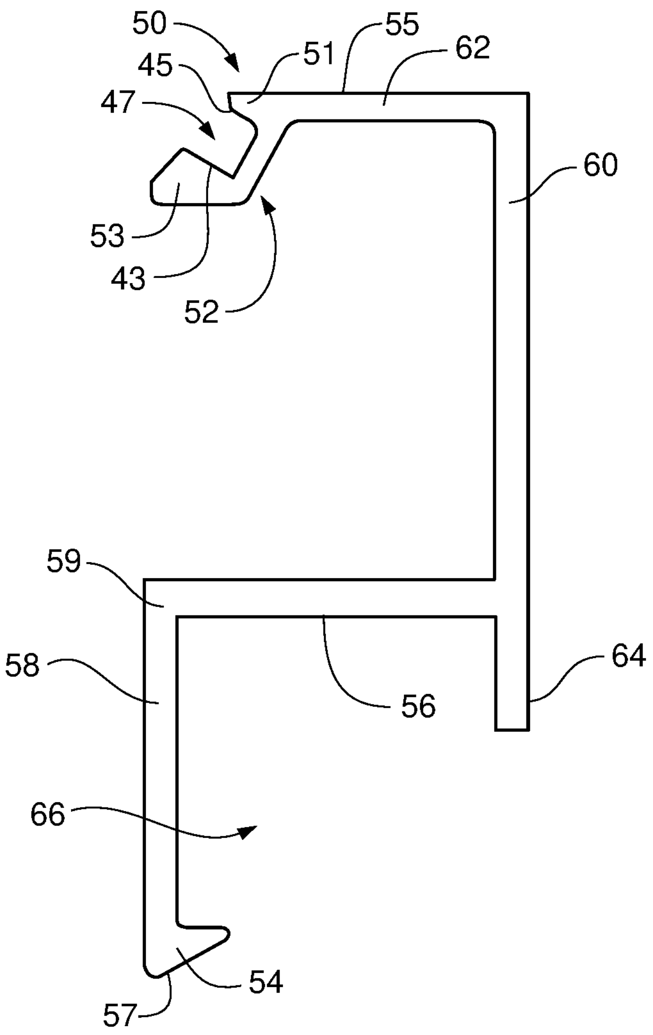
FIG. 3A is a pictorial representation of a cross-section of an embodiment of an offset adapter device of the present disclosure for installing glass in a door.
Figure 3B:
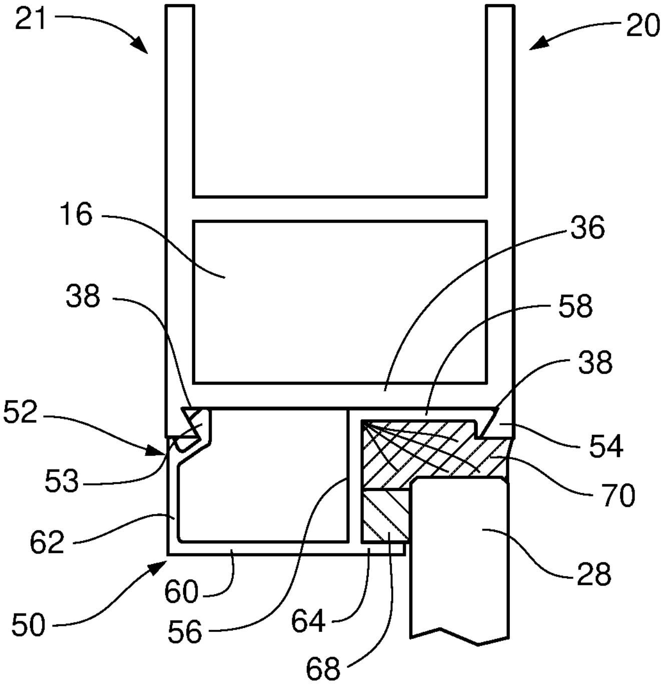
FIG. 3B is a pictorial representation of a cross-section through a top rail of a glass door of the present disclosure with the glass installed with the offset adapter device of FIG. 3A, and also represents an installation in a bottom rail (if FIG. 3B were inverted).
Figure 3C:
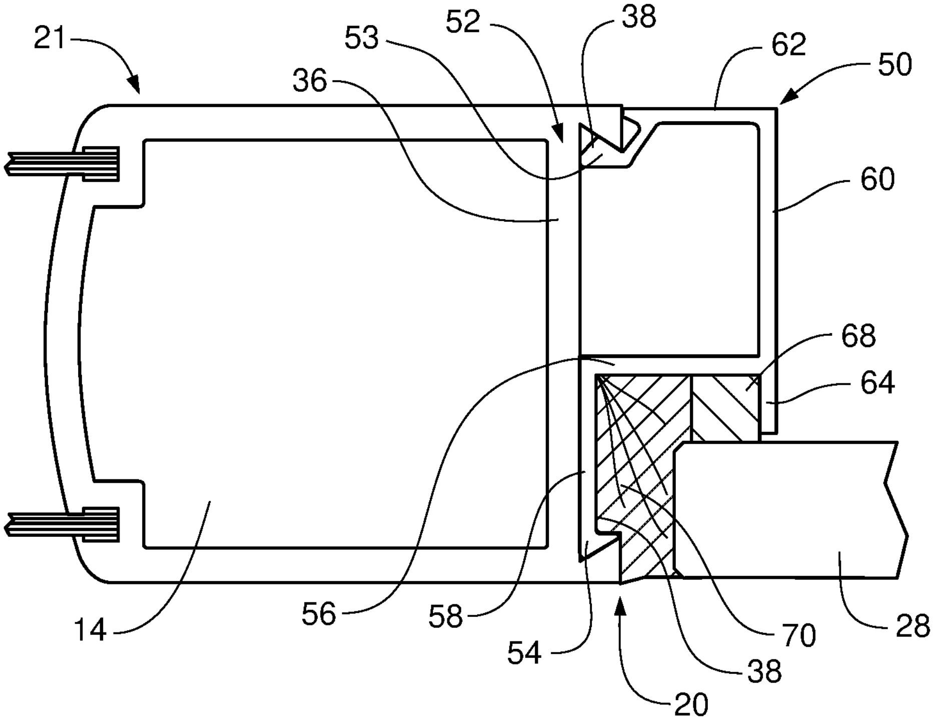
FIG. 3C is a pictorial representation of a cross-section through a stile of a commercial glass door of the present disclosure with the glass installed with the offset adapter device of FIG. 3A.
Figure 4A:
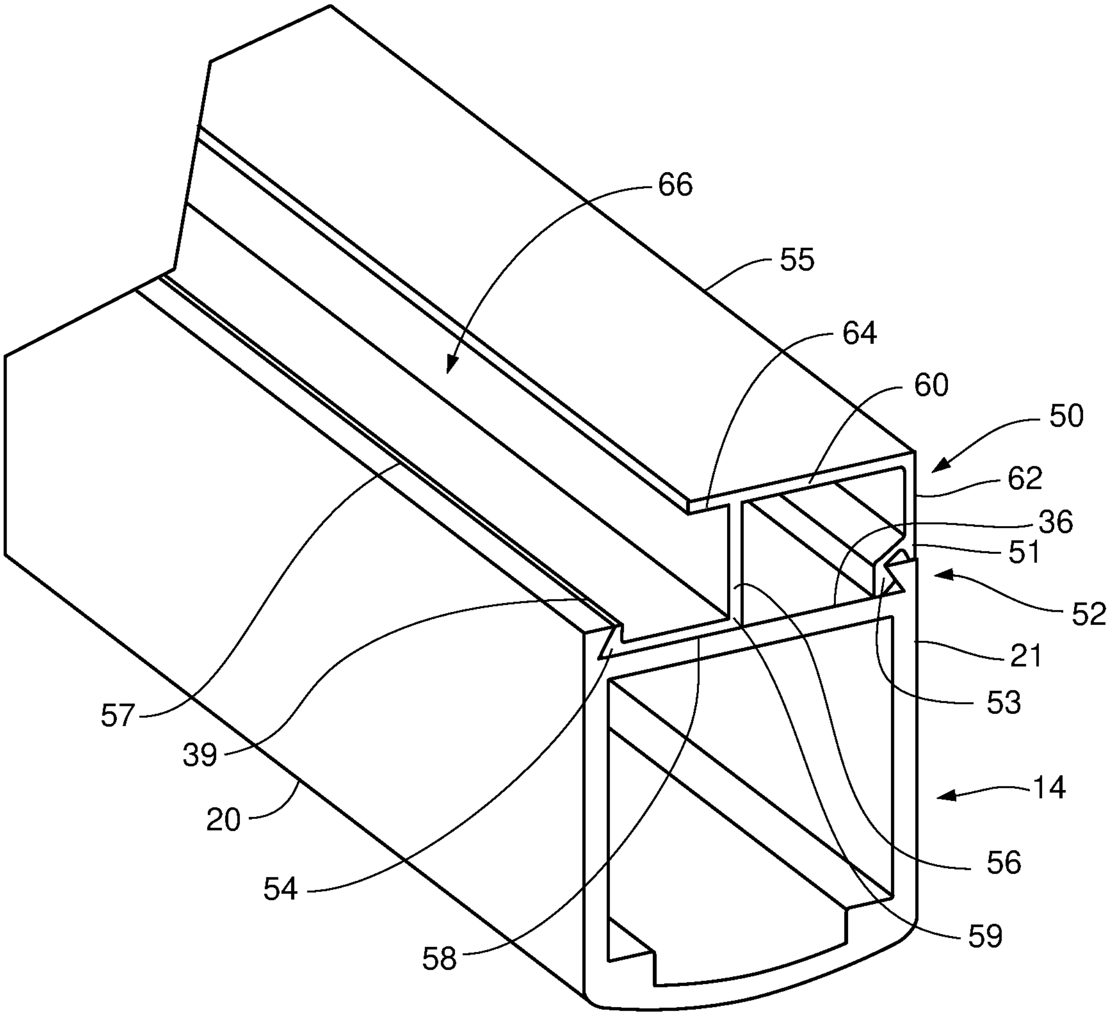
FIG. 4A is a pictorial representation of a top, front perspective view of a right stile of a door with an embodiment of an offset adaptor of the present disclosure installed.
Figure 4B:
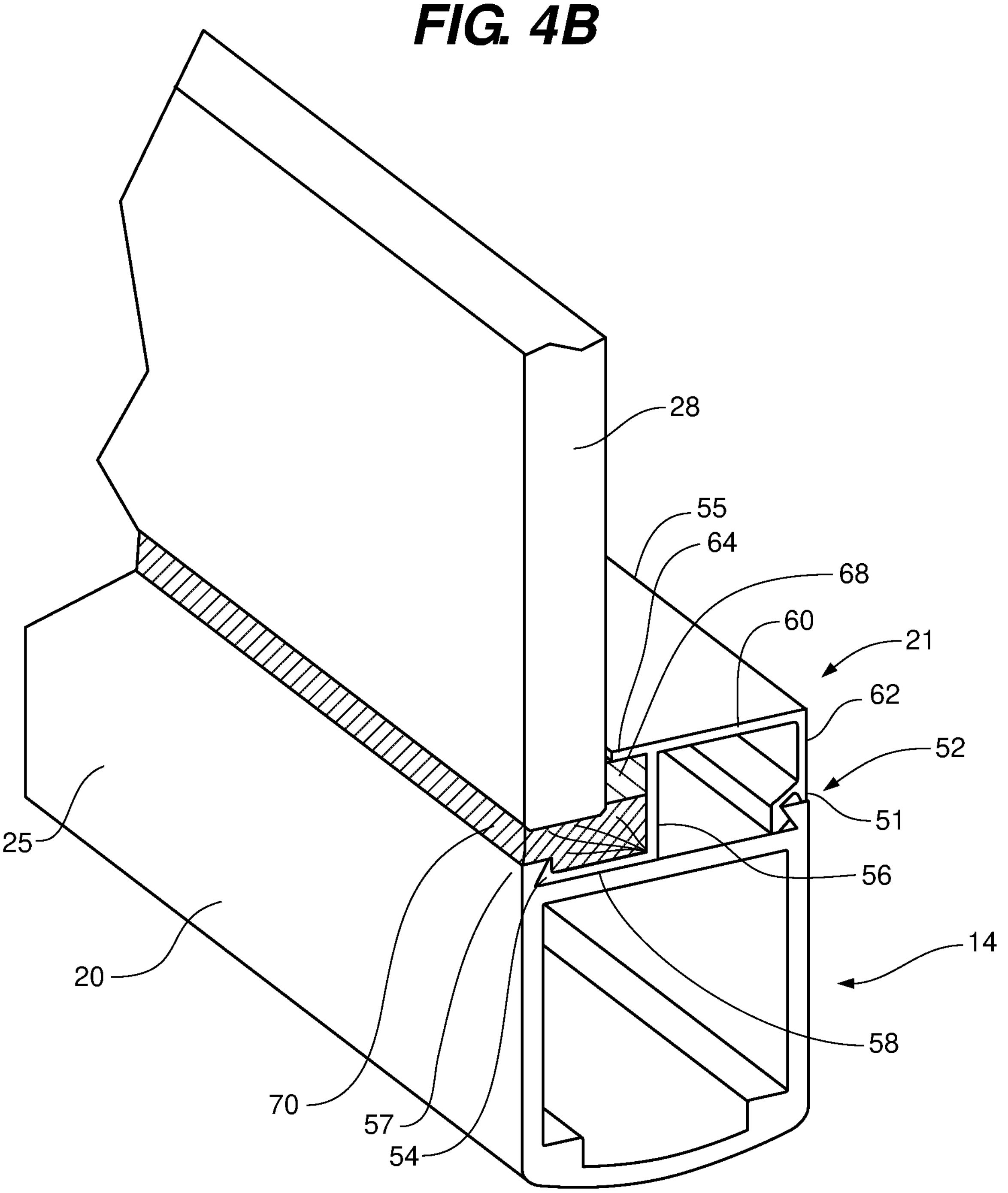
FIG. 4B is a pictorial representation of a top, front perspective view of the right stile of the door of FIG. 4A with the glass installed via the offset adaptor.

Referring to FIG. 3A, as well as FIGS. 4A and 4B, the present disclosure is directed to a structural offset adaptor 50 (also referred to herein as "adaptor 50" for short) that allows installation of glass in a door, so that it is flush with a surface, for example, the push surface 25, of the door, using structural silicone glazing. It should be noted that while the embodiment of the structural offset adaptor 50 depicted in FIGS. 3A-3C is configured for installing ½ "thick non-insulated glass for use in interior applications of a commercially available narrow stile door frame, an example of which is shown in FIG. 1, it could also be used in exterior applications in geographical areas that do not require thermal applications, such as Florida or Texas. Furthermore, it should be noted that the structural offset adaptor 50 of the present disclosure is not limited to the particular embodiment shown. For example, embodiments of the structural offset adaptor 50 may be adapted for use with thermal insulated glass, or other thicknesses of glass, as well as for use with different types of doors with differently configured glass-facing sides 36 than that shown in FIG. 2D, for example.

Figure 3D:
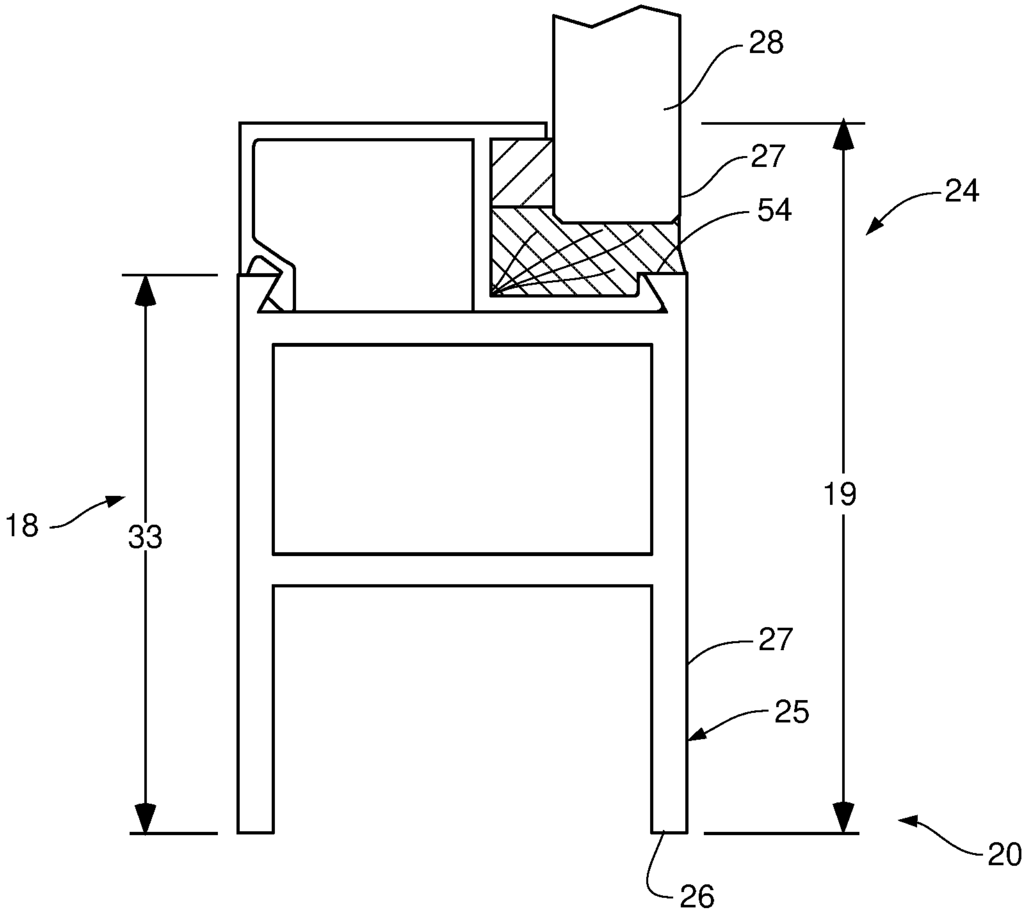
FIG. 3D is a pictorial representation of a cross-section through a bottom rail that is less than 10 inches in height of a glass door of the present disclosure with the glass installed with the offset adapter device of FIG. 3A.

FIG. 3B and FIG. 3C show a cross-section through the top rail 16 and the right stile 14 of a commercial glass door, respectively, and through the embodiment of the structural offset adaptor 50 with the glass pane 28 installed. FIG. 3D shows a cross-section through the bottom rail 18 of the door, which, in this embodiment, is of the same height as that of the top rail 16 shown in FIG. 3B. FIG. 4B is a perspective view showing the glass pane 28 installed in the right stile 14 of FIG. 3C. The structural offset adaptor 50 is shown in these figures as installed together with the glass 28, using structural silicone glazing, so that the glass pane 28 is flush with the push side 20 of the door.

The exemplary door of FIGS. 3B-3C and FIG. 4A, 4B is of similar structure to that shown in FIG. 1. While styles of door frames can differ, the inner perimetral surfaces 36, also referred to herein as glass-facing sides 36, of door frames typically have a channel or socket formed between walls extending upward along each of the front side 20 and back side 21 of the door 5. Connectors, such as snap-in connectors 23 described herein, are configured to fit into the channel. As further described supra in reference to FIG. 2D, each glass-facing side 36, which together form an inner perimeter of the door frame 10, may be in the shape of a socket 37, for example, dovetail-type socket, with a channel 38, such as the V-shaped channels 38 shown, being formed along each of the front side 20 and the back side 21 of the door.

Referring to FIGS. 3A and 4A, together with FIGS. 3B, 3C, and 4B, the structural offset adaptor 50 is a body, preferably a unitary body, configured to be installed onto the glass-facing side 36 of a stile 12, 14 or rail 16, 18. In embodiments, the structural adaptor 50 configured for a particular stile 12, 14 or rail 16, 18 is configured to extend a full length of the socket 37 formed in the glass-facing side 36 of the corresponding stile 12, 14 or rail 16, 18.

Referring to FIGS. 3A, 4A, and 4B, for example, the adaptor 50 includes an outer wall 62 positioned along a first side 55 of the adaptor, and a first connecting portion 52 (also referred to herein as snap-in connecting portion 52) formed along the first side 55 configured to mount and retain the adaptor 50 on one of the glass-facing sides 36 of the door frame 10.

In embodiments, the outer wall 62 in use is parallel to the push side 20 and back side of the door 5. In further embodiments, the outer wall 62 of the adaptor 50 in use is flush with the back side of the door.

The first connecting portion 52 is formed from a lower edge portion 51 of the outer wall 62, and an angled surface portion 53 extending inwardly and downwardly from the outer wall 62 to form a receiving channel 47 therebetween. The angled surface portion 53 is configured to fit snugly against surfaces of, and into, the channel 38 aligned along the back side 21 of the door. In embodiments (see FIG. 3A), a first inner surface 43 of angled surface portion 53 forms a first wall of the receiving channel 47 and is angled to adjacently rest against the inner surface of the V-shaped channel 38. A second inner surface 45 of angled surface portion 53 forms a second wall of the receiving channel 47. In embodiments, the second inner surface 45 is parallel to first inner surface 43.

In cooperation with the receiving channel 47 and the lower edge portion 51 of the outer wall 62, which are configured to hook onto and over the channel 38 aligned along the back side 21 of the door, the first connecting portion 52 is configured to snap the adaptor 50 snugly into place both over, and into, the channel 38.

The first (snap-in) connecting portion 52, in embodiments, may have a hooked profile or cross-sectional shape as shown in FIG. 3A, which may be C-shaped, U-shaped, or V-shaped, for example. As one of skill in the art will appreciate, other shapes may be desirable, the particular cross-sectional shape or profile of the connecting portion 52, including of angled portion 53 and receiving channel 46, being preferably configured to fit the shape of the glass-facing side of the door into which the adaptor 50 will be positioned. The first (snap-in) connecting portion 52 extends, in use, along the first side 55 of the adaptor 50, which is configured, in embodiments, to extend along the back side 21 of the door 5 (see FIG. 4B, e.g.).

To facilitate locking the adaptor 50 in place via the snap-in connecting portion 52, the adaptor 50 also includes a second connecting portion 54 formed, and extending, along a second side 57 of the adaptor 50, and opposite the first connecting portion 52. The second connecting portion 54 together with the first connecting portion 52 is configured to mount and retain the adaptor 50 on one of the glass-facing sides 36 of the door frame 10. In embodiments, the second connecting portion 54 is configured to match the contour of the channel 38 preferably along the push side 20 of the door. For example, for the V-shaped channels 38 shown in the embodiments, the second portion 54 may be wedge-shaped to complement and snugly fit the shape of the V-shaped channel. To install the adaptor 50, the second connecting (wedge-shaped) portion 54 is pushed against and into the V-shaped channel 38 along the push side 20 of the door frame 10 while the first (snap-in) connecting portion 52 is pushed via the angled surface portion 53 down into the V-shaped channel 38 along the back side 21 of the door, and around and over (via the receiving channel 47 and the lower edge portion 51 of the outer wall 62) the V-shaped channel 38 along the back side 21 of the door frame 10 until it snaps into a retained, installed, position on the glass-facing side 36 of the door frame 10.

The structural offset adaptor 50, in embodiments, also includes an inner wall 56 operatively connected to the first 52 and second connecting portion 54 and, in embodiments, aligned parallel to the outer wall 62. In the embodiment of FIGS. 3A-3C, with reference also to FIG. 4A, the structural offset adaptor 50 also includes a lower leg 58 which extends perpendicularly outward from a lower end portion 59 of the inner wall 56 and terminates at the second connecting (wedge-shaped) portion 54 along the second side 57 of the adaptor 50. When the adaptor 50 is installed in use, the lower leg 58 rests on the glass-facing side 36 of a rail or stile, for example, of top rail 16 in FIG. 3B or right stile 14 of FIG. 3C, also shown in FIGS. 4A, 4B.

In embodiments, when the adaptor 50 is positioned in use on one of the inner perimetral surfaces 36, the second connecting portion 54 is configured to be confined within the channel 38 and does not extend above an uppermost planar surface 39 (see FIG. 3D, 4A) of the inner perimetral surface 36.

The structural offset adaptor 50, in embodiments, further includes an upper leg 60 aligned parallel to the lower leg 58. The upper leg 60 extends connectedly and perpendicularly inwardly from the outer wall 62 of the adaptor 50, an end portion 64 of the upper leg 60 extending beyond the inner wall 56, and, in embodiments, is perpendicularly connected to the inner wall 56. The end portion 64 of the upper leg 60 extends over only a portion of the lower leg 58, leaving an open portion 66 of the adaptor 50 which borders the inner wall 56 to accommodate the installation of the glass pane 28. Open portion 66 provides an unenclosed space that extends outwardly from the inner wall 56 beyond the end portion 64 and over and beyond second connecting portion 54 and second side 57. As described further herein, the termination of the end portion 64 between the inner wall 56 and the second side 57 of the adaptor 50 and the termination of the lower leg 58 in the second connecting portion 54 along the second side 57 forms the unenclosed space of the open portion 66 above the second connecting portion 54 and second side 57 for installing the glass pane 28 adjacent the end portion 64 and flush with the push surface 25 of the door frame 10. No outer wall is formed along the second side 57 of the adaptor that would undesirably enclose the space between the second side 57 and the inner wall 56 and thus prevent the glass pane 28 from being installed flush with the push surface 25.

The open portion 66 is formed along the push side of the door and is configured for installing the glass pane 28 flush to the push surface 25 of the door frame. In embodiments, the open portion 66 is positioned along the second side 57 of the adaptor 50, between the inner wall 56 and the second side 57, and above the lower leg 58.

In embodiments, the inner wall 56 is centered, or substantially centered, between the first side 55 and the second side 57 of the adaptor 50, the open portion 66 bordering the inner wall 56, and end portion 64 extends sufficiently beyond the inner wall 56, such that when the adaptor 50 is positioned in use, the glass pane 28 installed in the open space 66 adjacent the end portion 64 is off-center, and preferably flush with the push surface 25 of the door. In embodiments, the inner wall 56 together with the end portion 64 of the upper leg 60 which extends perpendicularly from the inner wall 56 over and adjacent to the open portion 66 define the positioning of the glass pane 28 together with adhesive material 68 as further described herein.

To accommodate different thicknesses of glass panes and manufacturing tolerances and still maintain the glass pane 28 adjacent the end portion 64 and flush with the push surface 25 of the door frame, the inner wall 56, in embodiments, is positioned at a location between the inner wall 56 and the second side 57 that is not exactly centered, but is sufficiently centered, i.e., substantially centered, such that the glass pane 28 installed in the open space 66 in use is flush with the push surface 25 of a door frame 10.

In embodiments, the second side 57 of the adaptor 50 consists of the second connecting portion 54, which is configured to be confined within the channel 38 so that it does not extend above an uppermost planar surface 39 (see FIG. 3D, 4A) of the inner perimetral surface 36.

The end portion 64 of the upper leg 60 terminates at a distance from the inner wall 56 that is sufficient to allow mounting of the glass pane 28 flush with the push surface 25 of the door using structural silicone glazing as shown for example in FIG. 4B. In the embodiment shown, for example, referring to FIG. 3C, inner wall 56 is positioned about one inch from the outer wall 62, and the length of the end portion 64 extending beyond the inner wall 56 is about one quarter inch from the inner wall 56, and about 1/32 inch is left between the end of the upper leg 60 and the ½-inch thick glass as installed. It should be understood that the dimensions of the adaptor 50 may be modified as needed depending on the size and style of the door frame and the size and type of glass to be installed.

In embodiments, as best shown in FIG. 3D, a height 33 of the bottom rail 18 of a door of the present disclosure is less than ten inches high, and the push surface 25 of the bottom rail 18 is flush with the glass pane 28, so that the glass pane 28 forms a portion of the 10-inch high, smooth planar surface 27 of the lower portion 24 of the push surface 25 in compliance with ADA standards.

Referring to FIGS. 3B, 3C and FIGS. 4A and 4B, the configuration of the adaptor 50 with inner wall 56 and the open space 66 extending to both the push side 20 of the door 5 and to the lower leg 58 of the adaptor 50 allows for structural silicon glazing on the push side 20 of the door so that the glass pane 28 is mounted flush to the door. No glass stops are needed.

In embodiments, the glass is positioned and retained adjacent the end portion 64 of the upper leg 60 and above and over the second connecting portion 64 in the unenclosed space of the open portion 66 using an adhesive material 68, for example, adhesive tape, and/or structural silicone applied between the inner wall 56 and the glass pane 28, as well as to the surface of the end portion 64 of the upper leg 60 and a silicone adhesive 70 applied between the glass pane 68 and the lower leg 58 of the adaptor 50. In embodiments, the silicone adhesive 70 is layered over the inner perimetral surface 36 along the push side 20 of the door frame 10, the second side 57 of the adaptor 50, and over the lower leg 58 of the adaptor 50, from the push side 20 of the door frame 10 to the inner wall 56. The glass pane 28 is positioned to rest directly on the silicone adhesive 70. The glass pane 28 is adhered to both the adhesive material 68, which fixes its position adjacent the end portion 64 and flush to the push side 20 of the door frame 10, and to the silicone adhesive 70, the glass pane 28 being positioned to rest directly on the silicone adhesive 70, which fixes its position relative to the inner perimetral surface 36 as well as its position adjacent the end portion 64. Accordingly, the portion of the open portion 66 not occupied by the glass 28 and by the adhesive 68 is filled with the silicone adhesive 70. The process and structure are the same for the bottom rail 18 shown in FIG. 3D as for the top rail 16, as shown in FIG. 3B.

The present disclosure is also directed to methods for installing a glass pane 28 flush to a surface, preferably the push surface 25, of a door frame 10 which includes first installing an embodiment of the structural offset adaptor 50 of the present disclosure onto an inner perimetral surface 36 of the door frame 10.

Figure 5:
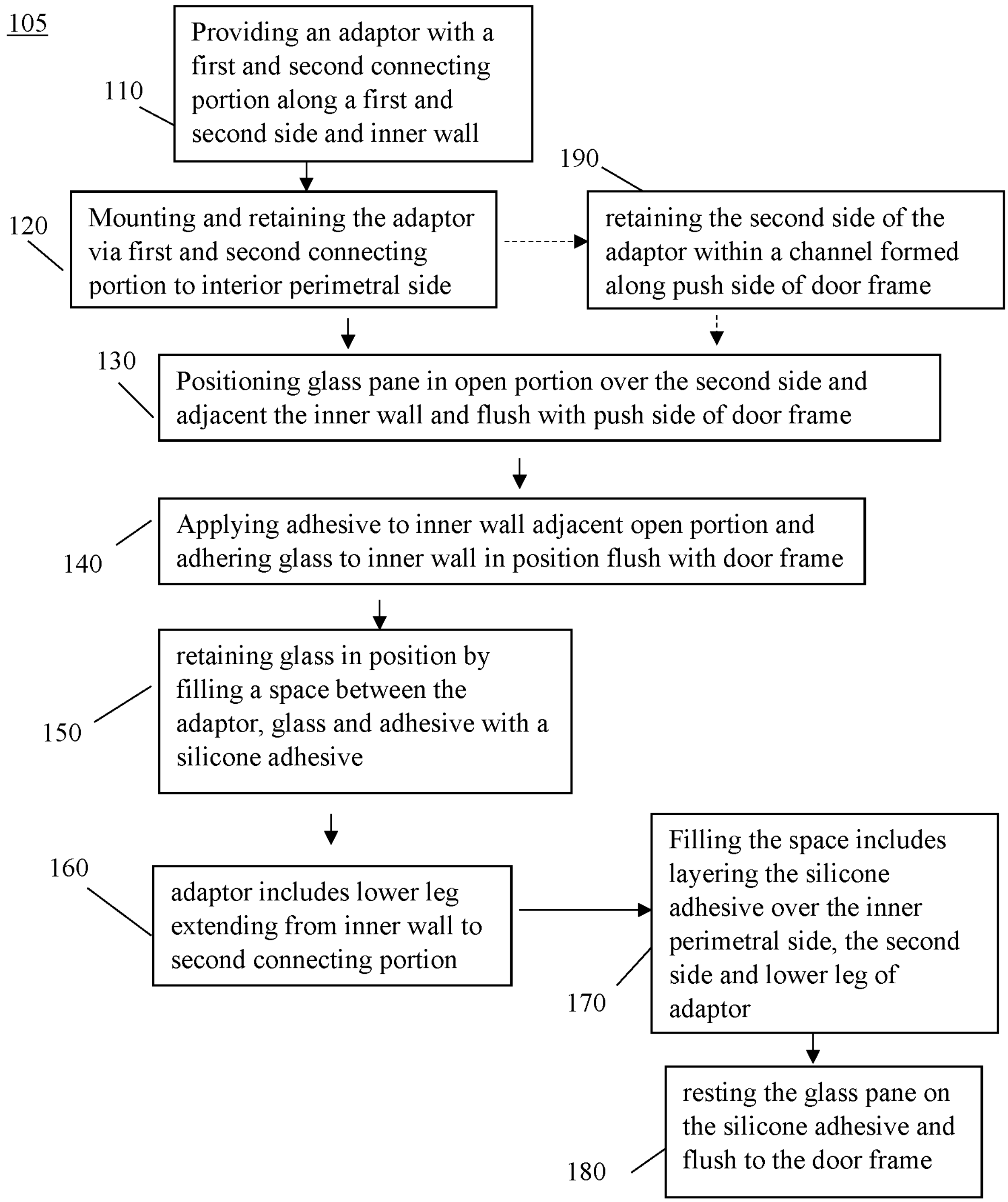
FIG. 5 is a flow chart representation of an embodiment of a method of installing a glass pane flush with a door frame.

In embodiments 100, with reference to FIG. 5, the method incudes providing an adaptor 50, at 110, configured to fit onto an inner perimetral surface 36 of the door frame 10, the adaptor 50 including a first side 55 and a second side 57 and an inner wall 56 positioned between and parallel to the first side 55 and the second side 57 of the adaptor 50.

The method further includes mounting the adaptor 50 on the inner perimetral surface 36 of the door frame 10, at 120, via a first connecting portion 52 formed along the first side 55 of the adaptor 50 and a second connecting portion 54 forming the second side 57 of the adaptor 50 including, in embodiments, positioning and retaining the first connecting portion 52 along the back side 21 of the door frame 10, and positioning and retaining the second connecting portion 54 along the push side 20 of the door frame 10.

The method also includes positioning the glass pane 28 in an open portion 66, at 130, over the second side 57 of the adaptor 50 adjacent the inner wall 56 of the adaptor 50 and flush with the door frame 10.

In further embodiments, the method may further include applying an adhesive material 68 to the inner wall 56 adjacent the open portion 66, at 140, and adhering the glass pane 28 to the inner wall 56 in position flush with the push side 20 of the door frame 10 via the adhesive material 68. The method may further include retaining the glass pane 28 in position flush with the push side 20 of the door, at 150, including, in further embodiments, filling a space 66 between the adaptor 50, the glass pane 28 and the adhesive material 68 with a silicone adhesive 70.

In still further embodiments, the adaptor 50 provided, at 160, also includes a lower leg 58 extending perpendicularly outward to the second side 57 from a lower end portion 59 of the inner wall 56 and terminating at the second connecting portion 54. In embodiments, filling the space 66, at 150, further includes, layering the silicone adhesive 70, at 170, over the inner perimetral surface 36 along the push side 20 of the door frame 10 and over the second side of the adaptor 50 and the lower leg 58 of the adaptor 50 from the push side 20 of the door frame 10 to the inner wall 56 of the adaptor 50.

The method may further include, at 180, resting the glass pane 28 on the silicone adhesive 70 and flush to the push surface 25 of the door frame 10.

In further embodiments, positioning and retaining the second connecting portion 54, at 120, may further include retaining the second side 57 of the adaptor 50, at 190, within a channel 38 formed along the push side 20 of the inner perimetral surface 36 of the door frame 10.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A swing door comprising:

a door frame, the door frame including a push side including a push surface, a back side opposite the push side, a left stile, a right stile, and a bottom rail extending from a bottom edge of the swing door from the left stile to the right stile of the swing door, and an inner perimetral surface, a glass pane installed in the door frame; and an adaptor formed as a unitary body mounted to the inner perimetral surface of the bottom rail of the door frame, the adaptor comprising:

a first side and a second side opposite and parallel to the first side, a first connecting portion formed along the first side of the adaptor, a second connecting portion forming a second side of the adaptor, the second connecting portion positioned parallel to and opposite the first connecting portion, an inner wall positioned between and parallel to the first side and the second side of the adaptor, and a lower leg extending perpendicularly outward to the second side from a lower end portion of the inner wall and terminating at the second connecting portion, wherein an open portion providing an unenclosed space is formed above the lower leg and the second connecting portion, adjacent the inner wall and extending outward from the inner wall to and over the second side of the adaptor;

wherein the adaptor is retained on the inner perimetral surface of the bottom rail of the door frame via the first connecting portion and the second connecting portion, the first connecting portion being positioned along and retained within the back side of the door frame, and the second connecting portion being positioned along and retained within the push side of the door frame, wherein the adaptor extends across the inner perimetral surface of the bottom rail from the push side to the back side of the door frame, the lower leg of the adaptor extending outward and terminating at the second connecting portion that is retained within the push side of the bottom rail, and wherein the glass pane is positioned in the open portion vertically above the second side of the adaptor and flush with the push surface of the door frame.

2. The swing door of claim 1, wherein the door frame includes a channel formed in the inner perimetral surface of the bottom rail extending along each of the push side and the back side of the door frame, each of the first connecting portion and the second connecting portion of the adaptor being retained within the channel extending along each of the push side and the back side of the door frame, respectively, and wherein the lower leg of the adaptor rests on the inner perimetral surface between the channel extending along each of the push side and the back side of the door frame.

3. The swing door of claim 1, wherein the adaptor further comprises an outer wall positioned along the first side of the adaptor wherein the first connecting portion is formed along a lower edge of the outer wall, and an upper leg extending perpendicularly inward from the outer wall of the adaptor, an end portion of the upper leg extending beyond the inner wall and over only a portion of the lower leg, and wherein the glass pane is positioned in the open portion adjacent the end portion and over the second side of the adaptor.

4. The swing door of claim 2, wherein the second side of the adaptor consists of the second connecting portion and is confined within the channel along the push side of the door frame.

5. The swing door of claim 3, further comprising an adhesive material between the glass pane and the inner wall, and between the glass pane and the end portion of the upper leg, the position of the glass pane adjacent the end portion of the upper leg and the inner wall being fixed by the adhesive material.

6. The swing door of claim 5, further comprising a silicone adhesive layered between the lower leg of the adaptor and the glass pane.

7. The swing door of claim 6, wherein the glass pane rests on the silicone adhesive and is positioned flush to the push surface of the door frame, wherein the silicone adhesive extends over the inner perimetral surface along the push side of the door frame, the second side of the adaptor, and the lower leg of the adaptor from the push side of the door frame to the inner wall of the adaptor.

8. The swing door of claim 6, wherein the adhesive material is adhesive tape.

9. The swing door of claim 3, wherein the glass pane positioned adjacent the end portion in the open portion is flush with the push surface of the door frame.

10. The swing door of claim 9, wherein the inner wall with the end portion extending perpendicularly therefrom is substantially centered between the first side and the second side of the adaptor.

11. The swing door of claim 1, wherein the bottom rail is less than ten inches high, and wherein a lower portion of the push surface of the door frame extending at least ten inches in height from the bottom edge of the swing door forms a planar surface that includes the push surface of the bottom rail and of the glass pane that is flush with the push surface of the bottom rail, the planar surface including the push surface of the glass plane and the bottom rail extending across a full width of the swing door and extending the at least ten inches in height from the bottom edge of the swing door such that the swing door is in compliance with the Americans with Disabilities Act.

* * * * *